United States Patent
Maheshwari et al.

(10) Patent No.: US 9,374,786 B1
(45) Date of Patent: Jun. 21, 2016

(54) SYSTEM AND METHODS FOR IMPROVING OPPORTUNISTIC ENVELOPE TRACKING IN A MULTI-SUBSCRIBER IDENTITY MODULE (SIM) WIRELESS COMMUNICATION DEVICE

(71) Applicant: QUALCOMM Incorporated, San Diego, CA (US)

(72) Inventors: Ankit Maheshwari, Hyderabad (IN); Subbarayudu Mutya, Hyderabad (IN); Revathi Sundara Raghavan, San Diego, CA (US); Qijia Liu, San Diego, CA (US); Parthiban Rajendran, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 14/624,012

(22) Filed: Feb. 17, 2015

(51) Int. Cl.
*H04B 1/04* (2006.01)
*H04W 52/02* (2009.01)
*H04W 88/06* (2009.01)

(52) U.S. Cl.
CPC .......... *H04W 52/0225* (2013.01); *H04W 88/06* (2013.01)

(58) Field of Classification Search
CPC ... H04B 1/02; H04B 1/3816; H04W 52/0225; H04W 88/06
USPC ................. 455/91, 67.11, 552.1, 558, 127.1, 455/127.5, 114.3
See application file for complete search history.

(56) References Cited

U.S. PATENT DOCUMENTS

| | | |
|---|---|---|
| 6,272,169 B1 | 8/2001 | Boswell, Jr. et al. |
| 6,721,355 B1 | 4/2004 | McClennon et al. |
| 7,472,293 B2 | 12/2008 | Kuhlmann et al. |
| 7,720,167 B2 | 5/2010 | Stopler |
| 7,813,416 B2 | 10/2010 | Reina |
| 8,265,572 B2 | 9/2012 | Kenington |

(Continued)

FOREIGN PATENT DOCUMENTS

| | | |
|---|---|---|
| WO | 9910995 A1 | 3/1999 |
| WO | 2014053166 A1 | 4/2014 |
| WO | 2014078103 A1 | 5/2014 |

OTHER PUBLICATIONS

International Search Report and Written Opinion—PCT/US2016/013392 ISA/EPO—May 3, 2016.

*Primary Examiner* — Tuan Pham
(74) *Attorney, Agent, or Firm* — The Marbury Law Group, PLLC

(57) ABSTRACT

Various embodiments enable a multi-SIM multi-active (MSMA) communication device to operate a power amplifier in a power saving envelope tracking mode when a first radio frequency (RF) resource is supporting data transmission to a communication network associated with a first SIM and a second RF resource is supporting a voice call in discontinuous transmission mode. A MSMA communication device processor may monitor the second RF resource supporting the voice call for silence periods, the power amplifier of the first RF resource may operate in a first power-saving mode during silence periods on the voice call, and the power amplifier of the first RF resource may operate in a second power-saving mode when the voice call on second RF resource is not in a period of silence. Periods of silence may be determined by monitoring a protocol stack of the second RF resource for silence descriptor (SID) frames scheduled for transmission.

30 Claims, 7 Drawing Sheets

(56) References Cited

U.S. PATENT DOCUMENTS

| | | |
|---|---|---|
| 8,718,188 B2 | 5/2014 | Balteanu et al. |
| 8,878,607 B2 | 11/2014 | Strange et al. |
| 2009/0296616 A1 | 12/2009 | Lim et al. |
| 2009/0310540 A1* | 12/2009 | Barany ............... H04B 7/2656 370/328 |
| 2009/0319812 A1 | 12/2009 | Laughlin |
| 2012/0184327 A1 | 7/2012 | Love et al. |
| 2012/0320810 A1* | 12/2012 | Nourbakhsh ...... H04W 52/0235 370/311 |
| 2013/0183916 A1 | 7/2013 | Khlat et al. |
| 2014/0055197 A1 | 2/2014 | Khlat et al. |
| 2014/0155127 A1 | 6/2014 | Dakshinamurthy et al. |
| 2014/0266462 A1 | 9/2014 | Schirmann et al. |
| 2014/0269986 A1 | 9/2014 | Nagode et al. |
| 2016/0035359 A1* | 2/2016 | Pilli ...................... G10L 19/012 704/210 |

* cited by examiner

SYSTEM AND METHODS FOR IMPROVING OPPORTUNISTIC ENVELOPE TRACKING IN A MULTI-SUBSCRIBER IDENTITY MODULE (SIM) WIRELESS COMMUNICATION DEVICE

BACKGROUND

Multi-Subscriber Identification Module (SIM) communication devices have become increasing popular because of their flexibility in service options and other features. In various types of multi-SIM wireless communication devices, each modem stack associated with a subscription may store information provisioned by its respective network operator in a SIM, which may allow the SIM to support use of various different communication services. For example, various wireless networks may be configured to handle different types of data, use different communication modes, implement different radio access technologies, etc. One type of multi-SIM wireless communication device, referred to as a dual-SIM dual-active (DSDA) device, is typically configured with separate transmit/receive chains associated with each SIM, thereby allowing simultaneous active connections with the networks corresponding to two SIMs.

To enable communications in various networks, a wireless communication device may process data to be transmitted over a radio frequency (RF) air interface, and may perform complementary processing on received RF signals to recover data. In particular, data transmission may involve encoding and modulating the data, generating data samples, and conditioning the samples to generate an output RF signal.

Wireless communication devices typically include a power amplifier ("PA") to provide high transmit power for the output RF signal. Wireless communication devices typically include a power amplifier to amplify the RF signal to a desired level for transmission, which may depend on how far the user is away from a base station. Next generation wireless systems use a wideband technology that allows for simultaneously transmitting multiple transmit signals, corresponding to different baseband signals, to one or more base stations over a plurality of channels. In some mobile communication devices, this requires transmitting the multiple transmit signals using a single power amplifier.

Since power amplification consumes power, techniques to improve the efficiency of power amplifiers may be implemented in mobile communication devices in order to prolong operation on a battery charge. Such techniques may include adjusting the power supplied to the power amplifier so that the applied power tracks the amount of power in the transmit signal. Adjusting the applied power based on the transmit signal is referred to generally as "envelope tracking" and there are different forms or modes of envelope tracking that can be implemented. Mobile communication devices configured to implement SIMs that are associated with separate RF resources may enable envelope tracking for the power amplifier supporting communications on an active SIM by utilizing transmit components associated with both SIMs. However, such efficiency mode may be disabled when both SIMs are involved in active communications.

SUMMARY

Systems, methods, and devices of various embodiments enable a multi-SIM communication device on which at least a first RF resource supporting an active communication with a communication network associated with a first SIM is communicating at the same time as a second RF resource supporting a voice call in discontinuous transmission (DTX) mode with a network associated with a second SIM to improve efficiency of a power amplifier. Various embodiments may include monitoring the voice call supported by the second RF resource for silence periods, operating the power amplifier in a first power-saving mode during silence periods of the voice call supported by the second RF resource, and operating the power amplifier in a second power-saving mode when the voice call supported by the second RF resource is not in a silence period. In some embodiments, the second power-saving mode provides less reduction in power consumption than the first power-saving mode. In some embodiments the first power-saving mode is an envelope tracking mode, and the second power-saving mode is one of an enhanced power tracking mode and an average power tracking mode.

In some embodiments, monitoring the voice call supported by the second RF resource for silence periods may include monitoring the second RF resource for silence descriptor (SID) frames scheduled by a modem stack associated with the second SIM. In some embodiments, operating the power amplifier in a first power-saving mode during silence periods on the voice call supported by the second RF resource may include operating the power amplifier in the first power-saving mode between transmissions of SID frames in response to transmission of a SID_FIRST frame. In some embodiments, operating the power amplifier in a second power-saving mode when the voice call supported by the second RF resource is not in a silence period may include operating the power amplifier in the second power-saving mode when SID frames are scheduled for transmission by the modem stack associated with the second SIM or in response to transmission of a SID_ONSET frame.

In some embodiments, monitoring the second RF resource for SID frames scheduled by a modem stack associated with the second SIM includes identifying a transmission rate of the SID frames based on a vocoder being used for the voice call in DTX mode, and identifying timing of the SID frames scheduled by the modem stack associated with the second SIM based on the identified transmission rate and at least one SID frame generated by a transmit-DTX (TX-DTX) processor.

In some embodiments, operating the power amplifier in a first power-saving mode may include enabling at least one component of the second RF resource to process an envelope signal corresponding to an RF transmit signal representing data transmitted in communications with the high speed communication network associated with the first SIM. In some embodiments, the at least one component of the second RF resource is a digital-to-analog converter (DAC).

Various embodiments may include detecting that the first RF resource supporting communications with the high speed communication network associated with the first SIM is communicating at the same time as the second RF resource supporting the voice call in DTX mode based on a state of a voice activity detector (VAD) flag.

In some embodiments, the communication network associated with the first SIM employs a Long Term Evolution (LTE) radio access technology. In some embodiments, the high speed communication network employs a modulation scheme in which amplitude and phase of an RF transmit signal are used to represent a data transmission. In some embodiments, the communication network associated with the second SIM is employing a GSM or UMTS radio access technology. In some embodiments, the communication network associated with the first SIM employs a radio access technology that allows for higher data speeds than the communication network associated with the second SIM.

Various embodiments include a wireless communication device including a wireless communication device configured to use at least a first SIM and a second SIM associated with first and second radio frequency (RF) resources, respectively, and a processor configured with processor-executable instructions to perform operations of the methods described above. Various embodiments also include a non-transitory processor-readable medium on which is stored processor-executable instructions configured to cause a processor of a wireless communication device to perform operations of the methods described above. Various embodiments also include a wireless communication device having means for performing functions of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features herein.

DETAILED DESCRIPTION

Figure 1:
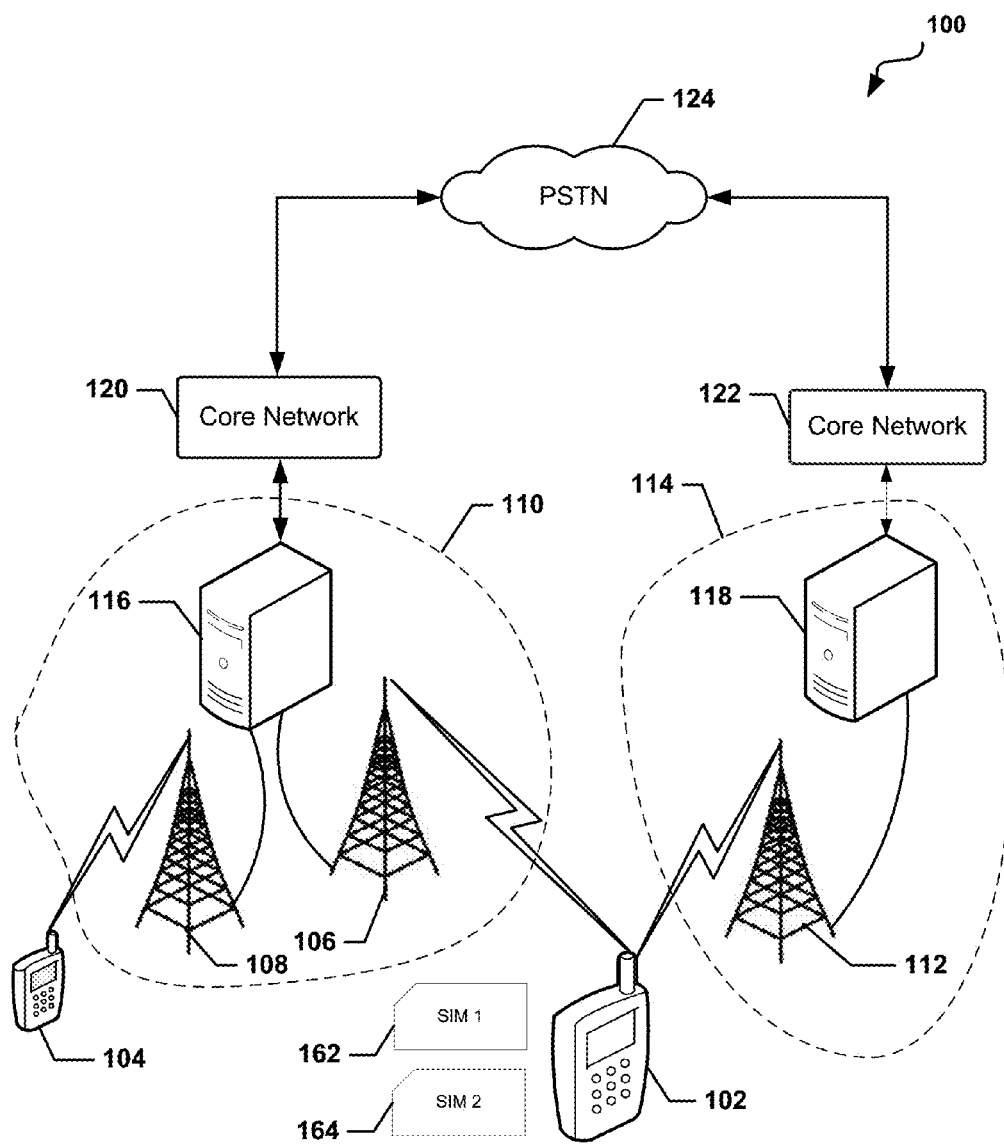
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the claims.

The various embodiments improve performance of a multi-SIM multi-active (MSMA) wireless communication device engaged in simultaneous communications by enabling a first power-saving mode, in some dual active scenarios. The MSMA wireless communication device in the various embodiments may be configured to use two or more power-saving modes. The first power-saving mode, an example of which is envelope tracking (ET), may provide the greatest reduction in power consumption by the power amplifier (i.e., may cause the power amplifier to consume the least current). A second power-saving mode, for example, may provide less reduction in power consumption by the power amplifier than the first power-saving mode. Examples of the second power-saving mode include enhanced power tracking (EPT) and average power tracking (APT). APT may provide less reduction in power consumption by the power amplifier than the EPT mode. Additionally, a selection of a no power-saving mode or a bypass mode may provide little or no reduction in the power consumed by the power amplifier.

Specifically, on a wireless communication device configured with independent RF resources, a first SIM may utilize some transmit components of an RF resource associated with a simultaneous voice call on a second SIM during silence periods of the voice call. For a voice call operating in a discontinuous transmission (DTX) mode, the wireless communication device may detect inactive speech (i.e., silence) periods. During such inactive speech periods, normal power saving procedures for the second SIM may be configured to intermittently transmit silence descriptor (SID) frames containing control information and comfort noise parameters instead of transmitting frames that do not include speech sounds (i.e., just background sounds). In the various embodiments, the first SIM may opportunistically operate a power amplifier in envelope tracking mode by utilizing transmit components of the RF resource associated with the DTX voice call in between the SID frames. Thus, additional opportunities for the first power-saving mode (e.g., ET) may be exploited on MSMA wireless communication devices, regaining some of the power efficiency lost during fallbacks to less efficient modes (referred to herein as a second power-saving mode, examples of which include, EPT and APT) implemented during simultaneous communications. This additional opportunistic ET implementation may have no adverse effect on the ongoing voice call because the RF resource supporting the voice call is conventionally inactive during the intervals between SID frames.

The terms "wireless communication device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless communication device on a network. The term SIM may also be used as shorthand reference to a communication network associated with a particular SIM, since the information stored in a SIM enables the wireless communication device to establish a communication link with a particular network, thus the SIM and the communication network, as well as the services and subscriptions supported by that network, correlate to one another.

As used herein, the terms "multi-SIM multi-active communication device" and "MSMA communication device" are used interchangeably to refer to a wireless communication device that is configured with more than one SIM and configured to use separate RF resources to independently handle communications with networks of two or more subscriptions. Dual-SIM dual-active (DSDA) communication devices are an example of a type of MSMA communication device.

As used herein, the terms "wireless network," "cellular network," "system," "public land mobile network," and "PLMN" are used interchangeably to describe a wireless network of a carrier associated with a wireless communication device and/or subscription on a wireless communication device, and/or its roaming partners.

As used herein, the terms "discontinuous transmission," "DTX mode," and "DTX period" are used interchangeably to refer to a mechanism that allows transmit circuitry to be switched off or reduced during periods when there is no speech data to be sent in order to save power in the device and reduce the overall interference level over the air interface.

As used herein, the term "RF resource" refers to the components in a wireless communication device that send, receive and decode radio frequency signals. An RF resource typically includes a number of components coupled together that transmit RF signals that are referred to as a "transmit chain," and a number of components coupled together that receive and process RF signals that are referred to herein as a "receive chain."

As used herein, the terms "envelope tracking," "envelope tracking mode," and "ET mode" are used interchangeably to refer to a technique for improving efficiency of a power amplifier during transmission on a wireless communication device by varying or controlling the voltage level of the power supply of the power amplifier in relation to an envelope of the transmitted RF signal. Thus, when the power level of the transmitted RF signal increases or decreases, there is a corresponding increase or decrease in the voltage supplied to the power amplifier. To implement envelope tracking, additional transmit chain components (e.g., a digital-to-analog converter (DAC)) may be needed in order to ensure that the power amplifier only receives the voltage, and thus the power, required to deliver the transmit signal in a linear fashion. Such additional components may be separately provided on the device or by opportunistic use of another idle transmit chain on the wireless communication device. The various embodiments enable opportunistic use of a transmit chain in use supporting an active voice call on one subscription to support envelope tracking on the transmit chain in use supporting another subscription. In various embodiments, envelope tracking is an example of a first power-saving mode implemented on a wireless communication device.

Wireless communication networks are widely deployed to provide various communication services such as voice, packet data, broadcast, messaging, and so on. These wireless networks may be capable of supporting communication for multiple users by sharing the available network resources. Examples of such wireless networks include Global System for Mobile Communications (GSM), Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), CDMA2000, Global System for Mobile Communications (GSM), etc.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices. For clarity, the embodiments are described below for GSM-type and/or UMTS-type networks, but may be applied to networks using any other radio technology or protocol.

An example GSM network may operate on any of a number of GSM bands (e.g., GSM 900, GSM 850, etc.), each of which cover multiple radio frequency (RF) channels identified by absolute radio-frequency channel numbers (ARFCNs). The ARFCNs for various GSM bands are given in 3GPP TS 05.05, entitled "Digital cellular telecommunications system (Phase 2+); Radio transmission and reception (Release 1999)." Further, each GSM network typically operates on a specific set of RF channels in a specific GSM band. In describing various embodiments, the terms "channel," "frequency," and "ARFCN" may be used interchangeably and may refer to channels in GSM bands, and/or channels in other network bands (i.e., UARFCNs for UMTS networks, etc.).

A multi-SIM wireless device that supports two or more SIM cards may have a number of capabilities that provide convenience to a user, such as allowing different wireless carriers, plans, telephone numbers, billing accounts, etc. on one device. Developments in multi-SIM wireless communication device technology have led to a variety of different options for such devices. For example, an "active dual-SIM" wireless device allows two SIMs to remain active and accessible to the device. In particular, a type of active dual-SIM wireless communication device may be a "dual-SIM dual active" (DSDA) wireless device in which two SIMs are configured to use separate transmit and/or receive circuitries (i.e., RF resources). Thus, in some DSDA devices, the SIMs may simultaneously operate in any of a variety of modes, such as active/connected mode (i.e., transmitting and/or receiving data), idle mode, etc.

The SIMs in a multi-SIM wireless communication device may be associated with the same or different PLMNs, each of which may have more than one wireless network. Each SIM is generally provisioned by a service provider with a list of preferred PLMNs from which the wireless communication device can receive service (i.e., a home PLMN and roaming partner PLMNs). In some embodiments, the wireless communication device processor may access nonvolatile memory associated with a given one of the SIMs to identify supported radio access technologies, and the corresponding enabled frequency bands (and ARFCNs/UARFCNs/channels in each band).

FIG. 1 illustrates a wireless network system 100 suitable for use with various embodiments. A first wireless communication device 102 and a second wireless communication device 104 may each be configured to establish wireless connections with cell towers or base stations of one or more radio access networks. For example, the wireless communication devices 102, 104 may transmit/receive data using a first base station 106 and a second base station 108, each of which may be part of a first network 110, as is known in the art. The first wireless communication device 102 may further be configured to transmit/receive data through a third base station 112, which may be part of a second network 114.

The networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, or other protocols that may be used in a wireless communications network or a data communications network. The networks 110, 114 may use the same or different wireless interfaces and/or physical layers. In some embodiments, the base stations 106, 108, 112 may be controlled by one or more base station controllers (BSC) (e.g., a first BSC 116 and a second BSC 118). For example, the base stations 106, 108, the first BSC 116, and other components may form the first network 110, as is known in the art. Alternate network configurations may also be used and the embodiments are not limited to the configuration illustrated. For example, in another embodiment the functionality of the first BSC 116 and at least one of the base stations 106, 108 may be collapsed into a single "hybrid" module having the functionality of these components.

In various embodiments, the first wireless communication device 102 may simultaneously access multiple core networks (e.g., a first core network 120 and a second core network 122) after camping on cells managed by the base stations 106, 112. The first wireless communication device 102 may also establish connections with Wi-Fi access points (not shown), which may connect to the Internet. While various embodiments are particularly useful with wireless networks, the embodiments are not limited to wireless networks and may be implemented over wired networks with no changes to the methods.

In the wireless network system 100, the first wireless communication device 102 may be a multi-SIM wireless communication device that is capable of operating with a plurality of SIMs (e.g., a first SIM 162 and a second SIM 164). For example, the first wireless communication device 102 may be a multi-SIM multi-active wireless communication device. Using multi-SIM multi-active functionality, the first wireless communication device 102 may simultaneously access each of the core networks 120, 122 by camping on cells managed by the base stations 106, 112. The core networks 120, 122 may be interconnected by a public switched telephone network (PSTN) 124, across which the core networks 120, 122 may route various incoming and outgoing communications to the first wireless communication device 102.

The first wireless communication device 102 may make a voice or data call to a third party device, such as the second wireless communication device 104, using one of the SIMs 162, 164. The first wireless communication device 102 may also receive a voice call or other data transmission from a third party. The third party device (e.g., the second wireless communication device 104) may be any of a variety of devices, including, but not limited to, a mobile phone, laptop computer, PDA, server, etc.

Some or all of the wireless communication devices 102, 104 may be configured with multi-mode capabilities and may include multiple transceivers for communicating with different wireless networks over different wireless links/RATs. For example, the first wireless communication device 102 may be configured to communicate over multiple wireless data networks on different subscriptions, such as in a multi-SIM multi-active wireless communication device. In particular, the first wireless communication device 102 may be configured with multi-SIM multi-active (MSMA) capabilities that enable the first wireless communication device 102 to simultaneously participate in two independent communications sessions, generally though independent RF resources (i.e., independent transmit/receive chains).

For clarity, while the techniques and embodiments described herein relate to a wireless communication device configured with at least one GSM subscription, they may be extended to subscriptions on other radio access networks (e.g., UMTS/WCDMA, LTE, CDMA, etc.).

Figure 2:
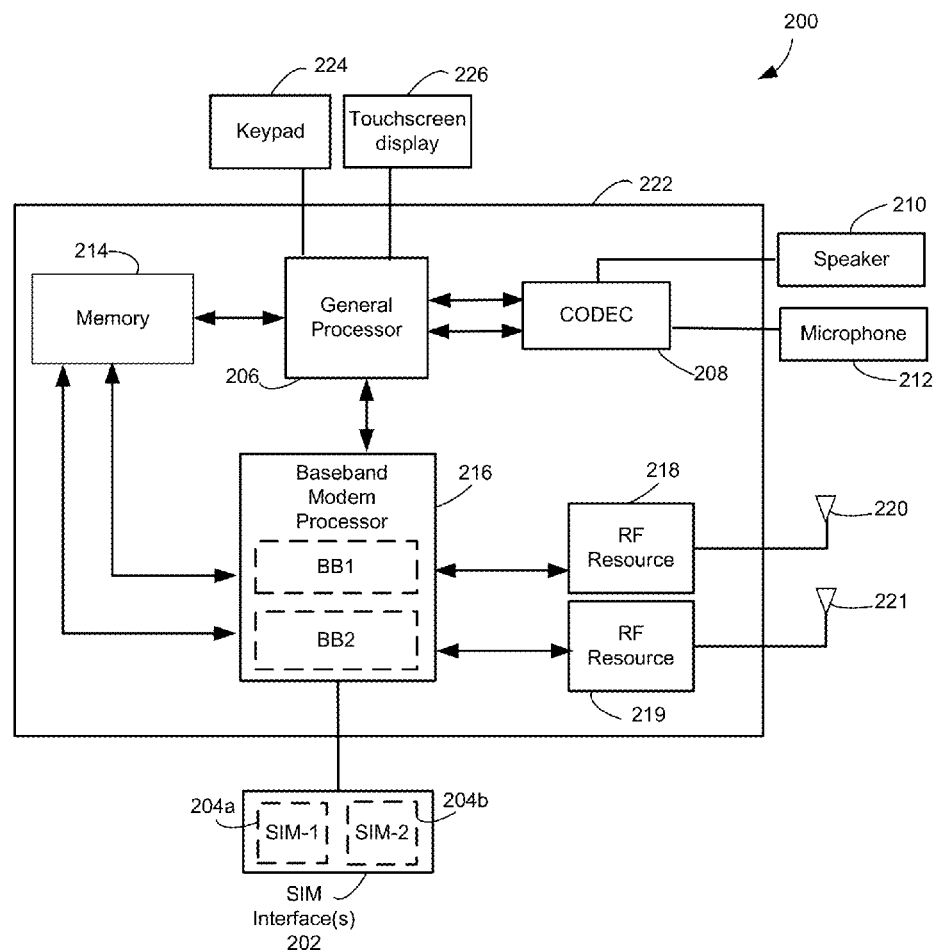
FIG. 2 is a block diagram illustrating a multi-SIM multi-active wireless communication device according to various embodiments.

FIG. 2 is a functional block diagram of a wireless communication device 200 suitable for implementing various embodiments. According to various embodiments, the wireless communication device 200 may be similar to one or more of the wireless communication devices 102, 104 as described above with reference to FIG. 1. With reference to FIGS. 1-2, the wireless communication device 200 may include a first SIM interface 202a, which may receive a first SIM ("SIM-1") 204a that is associated with a first subscription. The wireless communication device 200 may also include a second SIM interface 202b, which may receive a second SIM ("SIM-2") 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each of the SIMs 204a, 204b may have a CPU, ROM, RAM, EEPROM and I/O circuits. One or more of the SIMs 204a, 204b used in various embodiments may contain user account information, an IMSI a set of SIM application toolkit (SAT) commands and storage space for phone book contacts. One or more of the SIMs 204a, 204b may further store home identifiers (e.g., a System Identification Number/Network Identification Number (NID) pair, a Home PLMN (HPLMN) code, etc.) to indicate the SIM network operator provider. An Integrated Circuit Card Identity (ICCID) SIM serial number may be printed on one or more of the SIMs 204a, 204b for identification. However, a SIM may be implemented within a portion of memory of the wireless communication device 200 (e.g., memory 214), and thus need not be a separate or removable circuit, chip or card.

The wireless communication device 200 may include at least one controller, such as a general-purpose processor 206, which may be coupled to one or more coder/decoder (CODEC) 208. The CODEC 208 may in turn be coupled to a speaker 210 and a microphone 212. The general-purpose processor 206 may also be coupled to the memory 214.

The memory 214 may be a non-transitory tangible computer readable storage medium that stores processor-executable instructions. For example, the instructions may include routing communication data relating to the first or second subscription though the transmit chain and receive chain of a corresponding baseband-RF resource. The memory 214 may store operating system (OS), as well as user application software and executable instructions. The memory 214 may also store application data, such as an array data structure.

The general-purpose processor 206 and memory 214 may each be coupled to at least one baseband modem processor 216. Each of the SIMs 204a, 204b in the wireless communication device 200 may be associated with a baseband-RF resource chain that may include the baseband modem processor 216—which may perform baseband/modem functions for communicating with/controlling a RAT—and one or more amplifiers and radios, referred to generally herein as RF resources 218, 219. In some embodiments, baseband-RF resource chains may share the baseband modem processor 216 (i.e., a single device that performs baseband/modem functions for all SIMs on the wireless communication device 200). In other embodiments, each baseband-RF resource chain may include physically or logically separate baseband processors (e.g., BB1, BB2).

In various embodiments, the RF resources 218, 219 may be coupled to at least two wireless antennas 220, 221, and may perform transmit and/or receive functions for the wireless services associated with each of the SIM 204a, 204b of the wireless communication device 200. In some embodiments, the RF resources 218, 219 may be coupled to the wireless antennas 220, 221 for sending and receiving RF signals for the SIMs 204a, 204b, thereby enabling the wireless communication device 200 to perform simultaneous communications with separate networks and/or services associated with the SIMs 204a, 204b. The RF resources 218, 219 may provide separate transmit and receive functionality, or may include a transceiver that combines transmitter and receiver functions. In some embodiments, one or both of the wireless antennas 220, 221 may each represent a plurality of antennas associated with each of the RF resources 218, 219, such as to support diversity reception.

In some embodiments, the general-purpose processor 206, the memory 214, the baseband modem processor(s) 216, and the RF resources 218, 219 may be included in the wireless communication device 200 as a system-on-chip 222. In some embodiments, the first and second SIMs 204a, 204b and their corresponding interfaces 202a, 202b may be external to the system-on-chip 222. Further, various input and output devices may be coupled to components of the system-on-chip 222, such as interfaces or controllers. Example user input components suitable for use in the wireless communication device 200 may include, but are not limited to, a keypad 224 and a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the wireless communication device 200 to enable communication between them as is known in the art.

Functioning together, the two SIMs 204a, 204b, the baseband modem processor 216, the RF resources 218, 219, and the wireless antennas 220, 221 may constitute two or more RATs. For example, a SIM, baseband processor, and RF resource may be configured to support two different radio access technologies, such as GSM and WCDMA. More RATs may be supported on the wireless communication device 200 by adding more SIM cards, SIM interfaces, RF resources, and/or antennae for connecting to additional mobile networks.

Various embodiment wireless communication devices may have more than one RF resource that includes an antenna and/or other transmit chain components for performing transmit functions. The RF resources associated with a SIM may include two or more transmit chains, which may include, without limitation, an RF front end, components of the RF front end (including a transmitter unit), antennas, etc. The RF resources associated with a SIM may also include one or more receive chain that may include, without limitation, an RF front end, components of the RF front end (including a receiver unit), antennas, etc. In various embodiments, portions of the transmit and/or receive chains may be integrated into a single chip, or distributed over multiple chips.

Separate units of a baseband modem processor(s) (e.g., 216) of a multi-SIM device (e.g., 200) may be implemented as separate structures or as separate logical units within the same structure, and may be configured to execute software including at least two protocol stacks/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

Although multi-SIM wireless communication devices offer a variety of options to the end user, they also necessitate efficient execution of complex tasks. In particular, since multi-SIM wireless communication devices may perform simultaneous processes on different RF resources, power consumption associated with active SIMs may greatly impact the device performance and efficiency.

In conventional multi-SIM multi-active wireless communication devices, each RF resource may include at least one receive chain and a transmit chain, each of which may include various amplifiers. For example, the transmit chain may include at least one power amplifier that amplifies an RF signal prior to transmission via an antenna. In various embodiments, the one or more power amplifier that performs RF signal amplification for one or more transmit chains may be implemented in a power amplifier module, which may include any number of separate or shared components. The efficiency of a power amplifier may significantly impact capabilities of a wireless communication device in a number of ways. For example, the power amplifier efficiency may affect the battery life of the device, and the output power and linearity of the power amplifier may be directly correlated with transmission performance.

The continued evolution of wireless communication standards (e.g., GSM, UMTS, CDMA2000, etc.) and further evolved standards (e.g., LTE, etc.) may generate challenging technical requirements for transmit chains on a wireless communication device. Such challenges may include, for example, the need to support a variety of different channel coding and modulation techniques (CDMA, OFDM, etc.), as well as broader channel bandwidths. For example, in modulation schemes currently utilized for data transmission in some networks (e.g., LTE, WCDMA, etc.), RF transmit signals may incorporate information in an amplitude component in addition to phase and/or frequency components. As a result, the power amplifier cannot operate in compression, which would distort the amplitude information. Therefore, wireless communication devices capable of transmitting in such schemes may require use of linear power amplifiers, and suffer from reduced efficiency when operated below the maximum output power as limited by the battery voltage.

Specifically, the efficiency of a power amplifier using linear power amplification depends on the peak/average power ratio (PAPR) of the signal being amplified. If the peak to average ratio is positive (i.e., the waveform has higher peak levels when compared to the average), the power amplifier may be less efficient. This is because during instances of peak RF signal power application of full voltage is required in order to enable the power amplifier to deliver the required signal power; however, durations of peak RF signal power may be brief, and during the periods of lower RF signal power the power amplifier does not use the applied power and the power that not transformed into RF energy is dissipated as heat. The data rates implemented by various high speed networks (i.e., networks that support peak data rates of at least 100 Mbit/s in the downlink and 50 Mbit/s in the uplink) typically require large amounts of amplitude modulation to increase the number of bits per symbol, causing large amplitude variation in the time domain and thus a higher PAPR.

In various embodiments, the power amplifier may support multiple operating modes that may be associated with different output power levels, gains, etc. to mitigate constraints on linearity and efficiency discussed above. Typically, the power amplifier's generation of an amplified RF transmit signal ("RFout" signal) has at least some non-linearity, which may result in wasted power depending on the operating mode. For example, in a bypass mode, the battery voltage may be directly provided as a fixed power amplifier supply voltage for the power amplifier to amplify an upconverted RF signal ("RFin" signal). Since the power amplifier supply voltage must be greater than the signal peaks of the RF signal to be amplified (i.e., the RFin signal) to avoid clipping the RFout signal, the battery voltage of the wireless communication device in bypass mode may be a constant high value, regardless of whether the actual voltage of the RFin signal/transmit power required in the amplified RFout signal. As a result, excess current is drawn in the power amplifier and dissipated as wasted energy when the power amplifier operates in a bypass mode.

Another operating mode that may be implemented in a wireless communication device power amplifier is an average power tracking (APT) mode (referred to herein as an example of a second power-saving mode), which may reduce the power wasted by the power amplifier compared to the bypass mode. In the APT mode, the power amplifier supply voltage may be adjusted based on the average transmit power of the RFin signal. In this manner, the power amplifier supply voltage may cause the power amplifier to operate close to the compression point, thereby improving efficiency. In various embodiments utilizing APT mode, voltage values may be predetermined for every power levels so that linearity of the power amplifier may be maintained on a whole operating bandwidth. In some embodiments, in APT mode operation, the power amplifier supply voltage may be adjusted periodically after a fixed interval, for example, following each LTE slot (e.g., every 0.5 ms).

Another example of a second operating mode that may be implemented by a wireless communication device power amplifier is an enhanced power tracking (EPT) mode, which may further reduce wasted power and increase efficiency of the power amplifier compared to the APT mode. Operations in the EPT mode involve adjusting the power amplifier supply voltage based on average transmit power of the RF signal to be amplified (i.e., RFin signal), similar to in APT mode. However, in EPT mode the power amplifier supply voltage is reduced to below the compression point of the power amplifier, which may cause a loss of linearity/distortion at the power amplifier due to compression of some peaks in the waveform of the RFout signal. The EPT mode operation adjusts for this distortion/non-linearity using digital pre-distortion. That is, inverse distortion" may be provided to the power amplifier in order to correct for an expected amount of compression. In various embodiments using EPT mode, the amount of non-linearity to be expected based on the lowered power amplifier supply voltage may be pre-measured and stored in memory. Subsequently, the expected non-linearity may be compensated for when generating RF signals that represent a modulated waveform. In this manner, a correct amount of inverse distortion may be provided to the power amplifier along with the RFin signal.

As a further extension of the use of digital pre-distortion, another operating mode that may be implemented by a wireless communication device power amplifier is envelope tracking (ET), which is referred to herein as a first power-saving mode that saves more power than any second power-saving mode. The first power-saving mode (e.g., ET) may further reduce wasted power and increase efficiency compared to the second power-saving modes (e.g., EPT and APT). In the first power-saving mode, instead of adjusting the power amplifier supply voltage to approximate the compression point for the power amplifier, an "envelope" of the transmit signal to be amplified (i.e., plot of amplitude peaks) may be used to control the power amplifier supply voltage. In this manner, the power amplifier supply voltage may be continuously adjusted to operate at the peak efficiency for the power required at each instant of the transmission. Therefore, the first power-saving mode is typically the most power efficient operation for the power amplifier.

In various embodiments, operation in the first power-saving mode may require additional functions that are typically associated with the main RF transmit signal. For example, unlike in the second power-saving mode (e.g., APT and EPT), operating the power amplifier in the first power-saving mode (e.g., ET) requires converting a control signal (i.e., envelope) into an analog format to ensure that the power amplifier supply voltage is closely tracking the peaks of the RF transmit signal. This conversion is performed by a digital-to-analog converter (DAC) component.

While some wireless communication devices that are capable of operating on the first power-saving mode include an additional DAC for this purpose as part of the ET module, such additional circuitry increases the cost and power requirements of the wireless communication device. To avoid the cost of an additional DAC, some multi-SIM multi-active wireless communication devices opportunistically use transmit chain components of an RF resource associated with an inactive or idle SIM to support the first power-saving mode on an active SIM. For example, in a DSDA device transmitting a signal using a first RF resource, the first power-saving mode may be enabled by using the DAC associated with the first RF resource transmit chain for the RF transmit signal while the DAC associated with the second RF resource transmit chain may be used for the envelope. However, if both RF resources are used at the same time, such as for simultaneous communications on the SIMs, the DAC associated with the second RF resource transmit chain is unavailable for the opportunistic first power-saving mode. As a result, the power amplifier of the first RF resource will fall back to a less power efficient "second" operating mode (e.g., EPT or APT) for the power amplifier.

As use of wireless communication networks becomes more expansive, wireless bandwidth becomes increasingly scarce. To mitigate this problem, advanced voice compression techniques may be used to reduce the bandwidth needed by each voice call. For example, a standard 8-bits per data, 8000 samples per second voice coding, such as 64 kbits/s, may be reduced to 8 kbits/s or less via coder/decoders ("codecs") such as the GSM adaptive multi-rate (AMR) and enhanced full rate (EFR) codecs, and the CDMA enhanced variable rate codec (EVRC). Codecs typically operate on a collection of samples, which are compressed and sent as a frame of data. Some codecs, for example, divide a voice call into 20 ms time periods, sending a frame of voice data once every 20 ms.

Some voice codecs define not only a speech compression algorithm but also a silence compression algorithm. In a typical two-way conversation on a wireless communication device, each individual may speak slightly less than half of the time. During the periods without speech input (i.e., "silence periods"), transmitting the background noise detected by the wireless communication device's microphone may be an unnecessary use of network resources because the silence has no conversation information content.

By reducing the information transmitted during these silence periods by reducing the transmit signals, the duty cycle of the wireless communication device and use of network resources may minimized. This reduction in transmit signals may be accomplished on a conventional wireless communication device by employing a discontinuous transmission (DTX) mode. In the DTX mode, during silence periods, parameters that characterize the background noise, referred to as comfort noise, are generated and sent in silence descriptor (SID) update (SID_UPDATE) frames over the air interface at a lower rate than that of speech frames. The DTX mode improves the overall efficiency of a wireless voice communication system, conserving battery power and easing workload of the transmitter components on the wireless communication device, and frees up the RF communication channel to reduce interference and/or share the channel with other signals.

Unlike voice packets which are transmitted frequently (e.g., once per 20 ms), SID_UPDATE frames may be transmitted infrequently. The interval at which SID_UPDATE frames are transmitted depends on the voice codec used. Some codecs may detect the background noise present on the wireless communication device (i.e., near-end device) and characterize the background noise, such as determining its pitch and volume, and transmit the characterization parameters to the wireless communication device of the other party to the call (i.e., far-end receiving device). In the far-end receiving device, the noise parameters may be used to generate a slight background noise, such as soft white noise, recreating the background noise at the near-end sending device and thus convey to the listener the continued presence of the other party on the line.

The comfort noise parameters typically include a subset of speech coding parameters, such as synthesis filter coefficients and gain parameters. Example parameters within the SID frame include line spectral frequency (LSF) and energy gain. With these two pieces of information, roughly equivalent to the pitch and volume of the background noise, respectively, the receiving device may recreate (i.e., approximate) the background sound.

Typically, the start and end of a silence period is indicated by transmitting a SID_FIRST frame and SID_ONSET frame, respectively. During the silence period, comfort noise parameters are transmitted over the air interface at a fixed rate in SID_UPDATE frames. For example, using the full rate (FR) or enhanced FR (EFR) codec for speech channels in GSM systems, SID_UPDATE frames are typically transmitted at a rate of once per 24 frames (i.e., every 480 ms). Using the half rate (HR) speech codec, SID_UPDATE frames are typically transmitted at a rate that is twice that of the FR codec, or once per 12 frames (i.e., every 240 ms). Further, while adaptive multi-rate (AMR) frames are sent independently of the cell's TDMA frame structure, using the AMR speech codec, SID_UPDATE frames may be transmitted at a rate that is four times higher than that of FR or EFR codecs (i.e., once every 120 ms). In addition to SID_UPDATE frames, SID frames transmitted during the silence period may include control information.

The various embodiments use the transmission of SID frames to recognize when the transmit chain supporting an active voice call on one SIM will be available to support the use of the first power-saving mode (e.g., ET) on the transmit chain supporting another SIM, thereby increasing opportunities for saving power through envelope tracking on a multi-SIM multi-active communication device that does not have a DAC dedicated to supporting the first power-saving mode.

Figure 3:
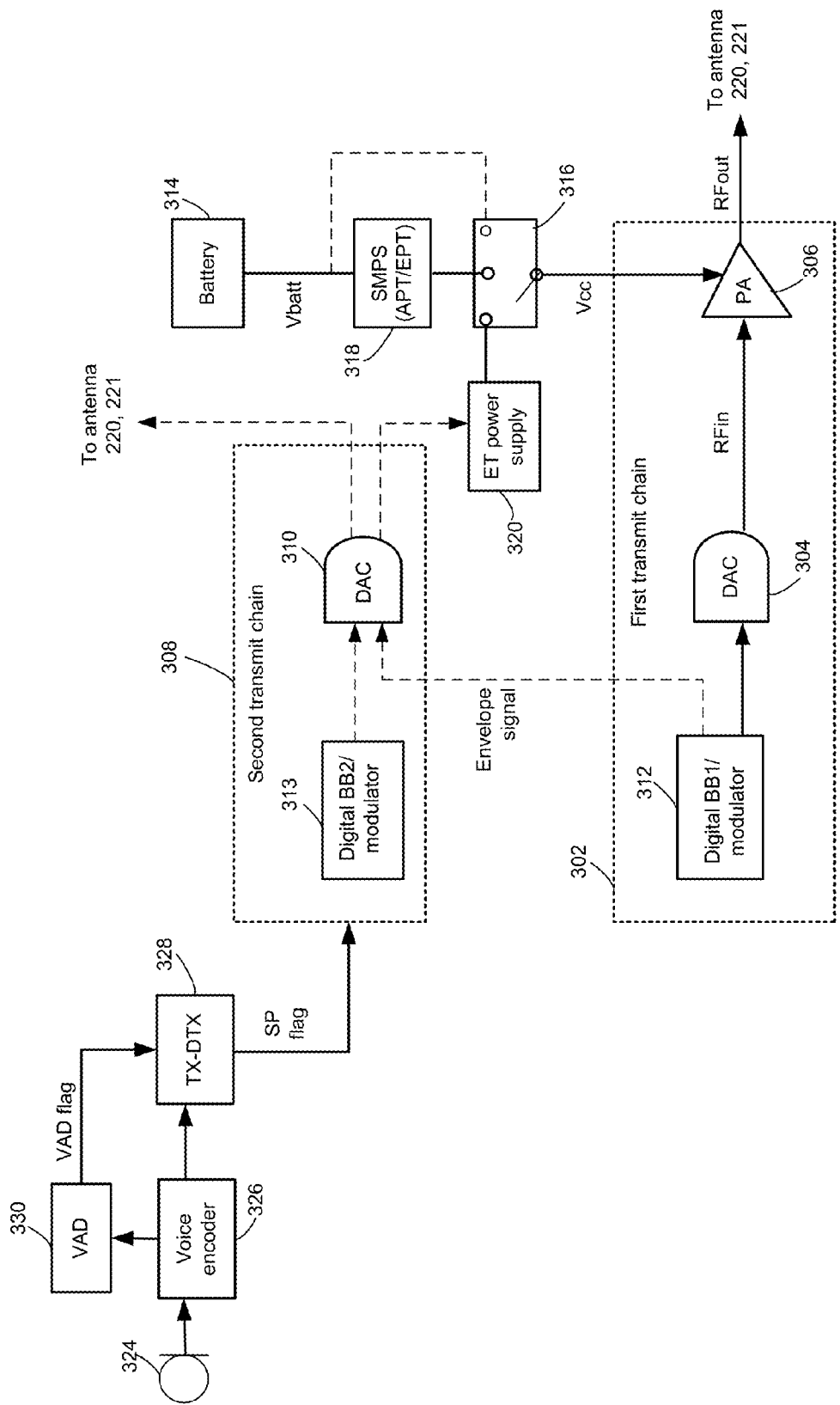
FIG. 3 is a block diagram illustrating an example configuration of components associated with controlling operation modes of a power amplifier on one or more radio frequency (RF) resource according to various embodiments.

FIG. 3 illustrates a configuration 300 of transmission elements that may interact in a multi-SIM multi-active wireless communication device to enable use of different modes to control power amplification according to various embodiments. Referring to FIGS. 1-3, such transmission elements in the configuration 350 may be functions and/or components of one of the wireless communication devices 102, 104, and/or 200 and may be associated with calls enabled on the first SIM 204a and/or second SIM 204b. In particular, the configuration 300 may enable the multi-SIM multi-active wireless communication device to operate in a bypass mode and the second power-saving mode (e.g., APT or EPT), as well as opportunistically operating in the first power-saving mode.

In various embodiments, communication data associated with a first SIM may be processed for transmission through a corresponding first transmit chain 302. The first transmit chain 302 may include any one or more components performing functions to route communication data associated with a first SIM for transmission through a corresponding baseband-RF resource chain. In some embodiments, the first transmit chain 302 may include functional components of the base-band modem processor(s) 216 (e.g., BB1) and RF frontend components of the RF resource 218 to condition signals for transmission. Such RF frontend components may include, for example, a digital-to-analog converter (DAC) 304, a power amplifier (PA) 306, as well as filters, mixers, and other components that are not shown, the functions and details of which are known in the art of digital transceiver design. Similarly, communication data associated with a second SIM may be processed for transmission through a corresponding second transmit chain 308. The second transmit chain 308 may include functional components of the base-band modem processor(s) 216 (e.g., BB2) and RF frontend components of the RF resource 219, including a DAC 310 and other RF frontend components discussed for the first transmit chain 302. In some embodiments, various RF frontend components may be shared between the first transmit chain 302 and the second transmit chain 308.

In various embodiments, in the configuration 300, functions of the baseband modem processor(s) 216 associated with the first SIM 204a and second SIM 204b may be implemented by digital BB1/modulator 312 and digital BB2/modulator 313, respectively. In particular, the digital BB1/modulator 312 may generate a modulated RF signal with the communication data for transmission associated with the first SIM. The digital BB1/modulator 312 may employ any of a number of modulation schemes (e.g., quadrature, polar, etc.) that encode the data for transmission by varying properties of an RF carrier waveform. For example, the digital BB1/modulator 312 may be configured to use quadrature amplitude modulation (QAM), in which in-phase (I) and quadrature (Q) signals based on the information baseband signal are represented as variations in the amplitude, frequency and/or phase of a waveform.

The modulated RF signal with the communication data for transmission may be input into the DAC 304, which converts the modulated RF signal into an analog format RFin signal. Other components may be provided in the first transmit chain 302 to perform functions including, but not limited to, mixers for upconverting the I and Q signals to radio frequencies, a signal combiner for combining the upconverted I and Q, filters that filter frequency content of signals, etc.

In various embodiments, the power amplifier 306 may be configured to amplify the analog format RFin signal received from the DAC 304 to generate the RFout signal at a desired output power level. The RFout signal in various embodiments may subsequently be provided to one or more antennas (e.g., 220, 221) for transmission over the radio interface to a network (e.g., 110, 114) through a base station (e.g., 106, 108, 112).

In some embodiments, the configuration 300 may include a power supply, such as a battery 314, which may provide battery voltage information (Vbatt) for use in adjusting voltage at the power amplifier 306. The configuration 300 may also include a mode switch 316 to allow the wireless communication device to switch operating modes by switching between sources of the power amplifier supply voltage. A switched mode power supply (SMPS) 318 may receive the Vbatt and generate a power amplifier supply voltage (Vcc) for the power amplifier 306 operating in the second power-saving mode (e.g., APT or EPT) as described.

In various embodiments, the DAC 310 may be configured to process an RF transmit signal as part of the second transmit chain 308 (i.e., from the digital BB2/modulator 313) or opportunistically to process an envelope signal associated with the first transmit chain 302 (i.e., the envelope of an RF transmit signal from the digital BB1/modulator 312). In the latter use, an ET power supply module 320 may generate an envelope signal based on information derived from the digital BB1/modulator 312, such as the I and Q baseband signals. In various embodiments, the envelope signal may be a differential signal tracking the amplitude peaks of the RF input signal, as discussed. For example, the envelope signal may be computed using the following calculation:

$$\text{Envelope} = \sqrt{I^2 + Q^2}$$

In various embodiments, the ET power supply module 320 may use the envelope signal to generate a power amplifier supply voltage for the power amplifier 306 as discussed. The ET power supply module 320 may also include and/or be associated with any of a number of components or provide functions relating to processing the envelope signal. For example, the ET power supply module 320 may include an amplitude detector an envelope shaping block to adjust the envelope signal to optimize linearity of the power amplifier.

The configuration 300 may further contain elements that interact in a wireless communication device to provide the DTX capability according to various embodiments, as discussed. While shown with respect to a call using the second transmit chain 308 (e.g., calls enabled by the second SIM 204b), the wireless communication device may also be configured with similar elements enabling DTX mode associated with calls using the first transmit chain 302 (e.g., calls enabled by the first SIM 204a). In various embodiments, a microphone 324 (e.g., 212) may convert an acoustic sound into an electric signal, which may in turn be provided to a voice (i.e., speech) encoder 326. In various embodiments, the voice encoder 326 may be part of the one or more CODEC 208. The voice encoder 326 may encode speech to a lower rate, producing speech frames that may be transferred to a transmit-DTX (TX-DTX) processor 328 and forwarded to the second transmit chain 308.

During an active voice call on the second transmit chain 308, when the associated modem stack is operating in normal mode, the TX-DTX processor 328 may forward the encoded speech frames to the second transmit chain 308, regardless of whether the signal produced by the microphone 324 contains actual speech or mere background noise. Using an antenna (e.g., 220, 221), the second transmit chain 308 may send the speech frames as an uplink signal over the radio interface to a network (e.g., 110, 114) through a base station (e.g., 106, 108, 112).

In various embodiments, a command received from the network (e.g., base stations 106, 108, 112) may trigger operation of the power amplifier 306 in DTX mode. During an active voice call on the second transmit chain 308, when the associated modem stack is operating in DTX mode, a Voice Activity Detector (VAD) 330 may analyze the signal produced by the microphone 324 to determine whether the signal contains speech or only background noise.

Specifically, as defined in accordance with various communication standards (e.g., GSM), the VAD 330 may analyze the energy and spectral changes of the signal produced by the microphone 324. Based upon this analysis, the VAD 330 may generate a VAD flag, the state of which indicates whether the signal includes speech (VAD=1) or mere background noise (VAD=0). When the VAD flag is set (VAD=1), the TX-DTX processor 328 may relay normal speech frames. When the VAD flag is not set (VAD=0), the TX-DTX processor 328 may generate SID frames containing comfort noise parameters (e.g., SID_UPDATE frames) and/or SID frames containing control information, both of which may be passed to the second transmit chain 308. In various embodiments, a speech (SP) flag may be set in the control bits of the frames delivered by the TX-DTX processor 328 to the second transmit chain 308 to indicate whether the transmitted frame is a normal speech frame (SP=1, SP flag set) or a SID frame (SP=0, SP flag not set).

When the state of the VAD flag changes from being set to not being set, the TX-DTX processor 328 may switch from transmitting encoded speech frames delivered by the voice encoder 326 to generating SID frames containing comfort noise parameters and control information. As discussed, the first SID frame of a silence period may be a SID_FIRST frame.

If the VAD 330 later detects speech from the parameters of the voice encoder 326, the VAD 330 may set the VAD flag in order to direct the TX-DTX processor 328 to restart continuous transmission of speech frames. In various embodiments, restarting transmission of speech frames (i.e., ending the DTX period) may be indicated by the TX-DTX processor 328 generating a SID_ONSET frame. The TX-DTX processor 328 may generate SID_UPDATE frames by employing or otherwise communicating with a comfort noise generator (not shown) in the wireless communication device.

While described with respect to LTE and GSM and/or UMTS networks, these are merely examples of networks to which serving cells for associated with the modem stacks of various embodiments may belong.

Figure 4A:
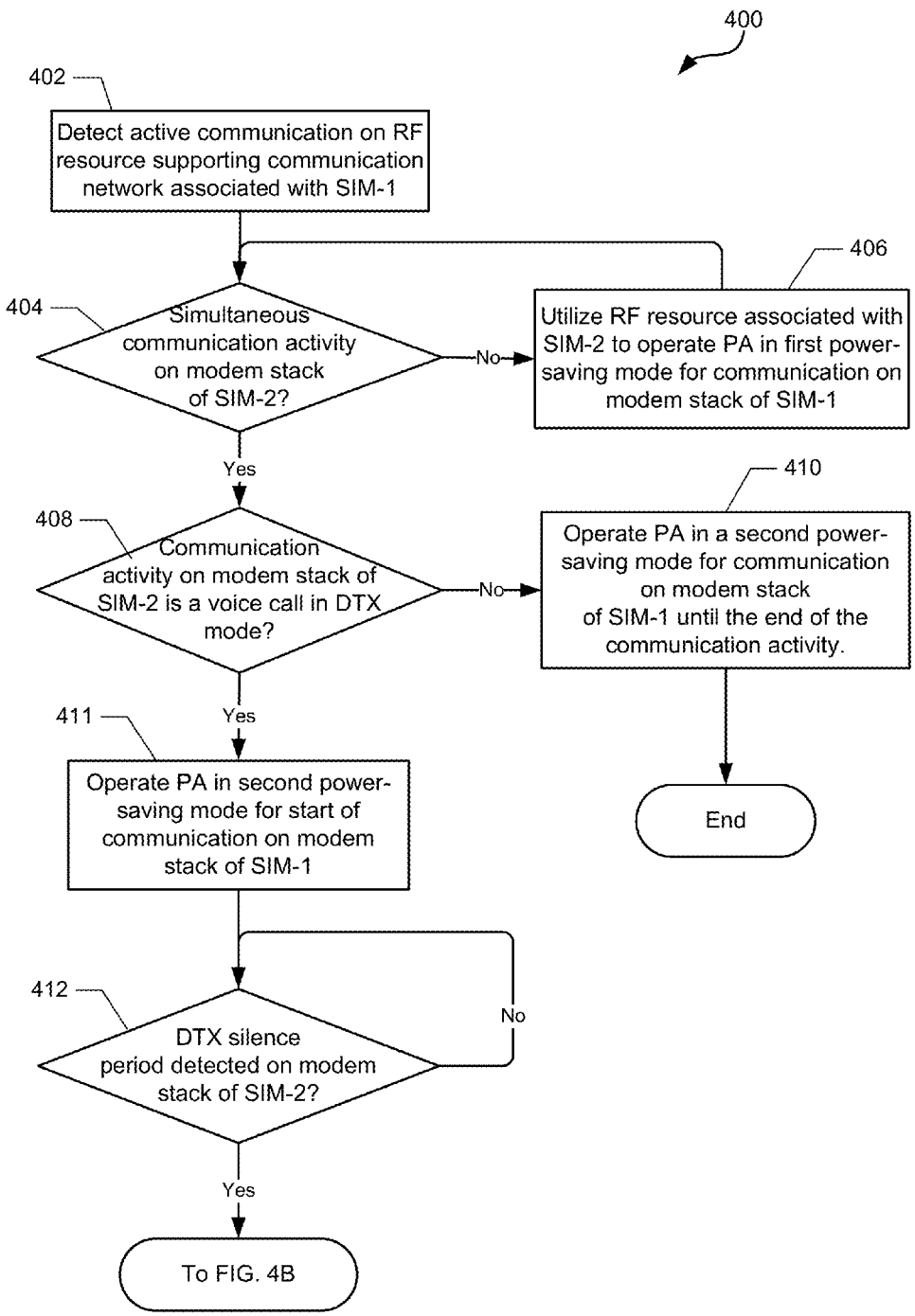
FIGS. 4A and 4B are process flow diagrams illustrating a method for improving the opportunistic use of envelope tracking (ET) mode for operating a power amplifier of a multi-SIM wireless communication device involved in simultaneous voice calls.
Figure 4B:
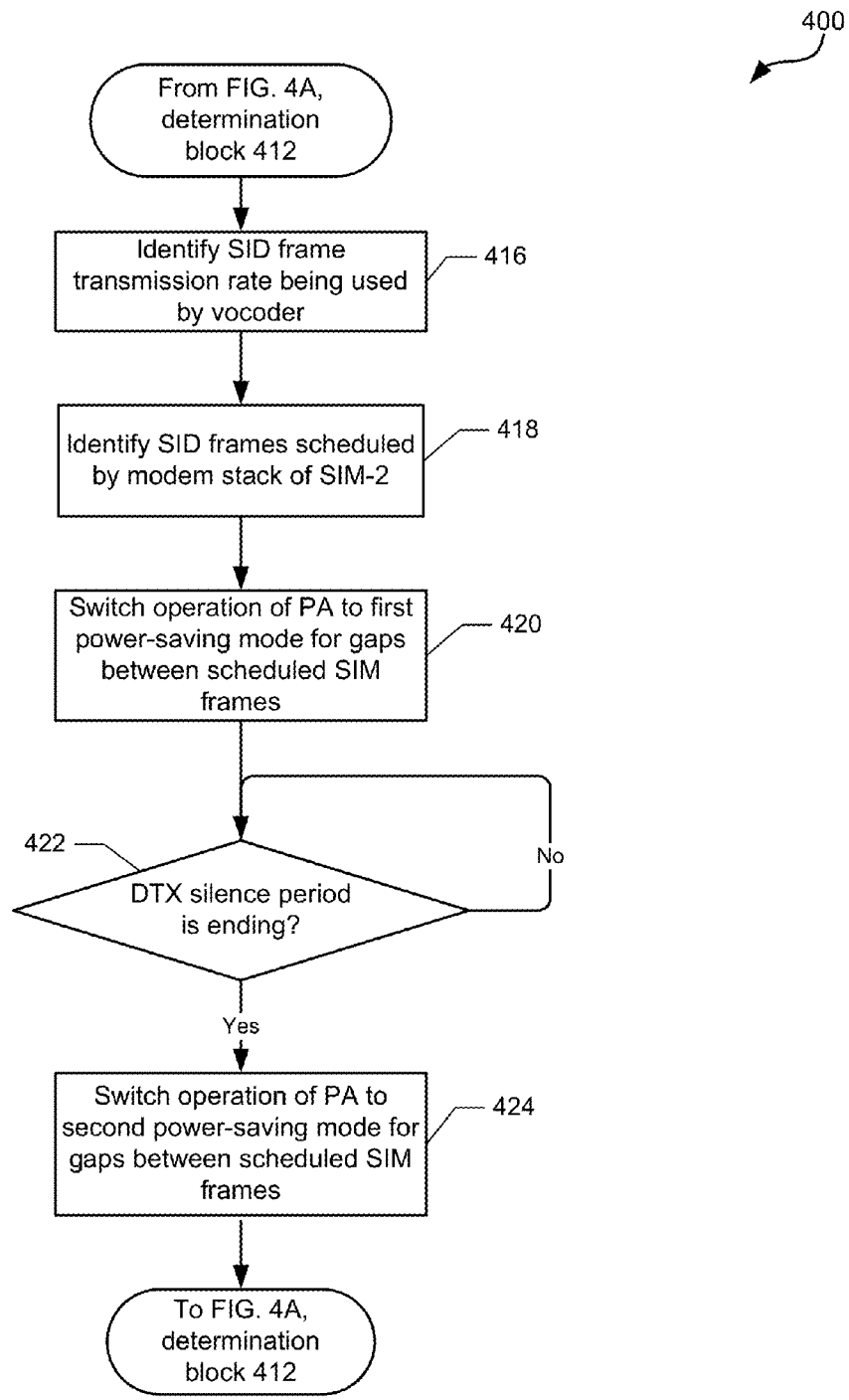

FIGS. 4A and 4B illustrate a method 400 for improving efficiency and performance with respect to transmission on a multi-SIM multi-active (e.g., DSDA) wireless communication device (e.g., 102, 104, 200 in FIGS. 1-2) according to some embodiments. With reference to FIGS. 1-4B, in various embodiments, the operations of the method 400 may be implemented by one or more processors of the wireless communication device, such as the general purpose processor 206 in FIG. 2 and/or baseband modem processor(s) 216, or a separate controller (not shown) that may be coupled to memory (e.g., 214) and to the baseband modem processor(s) 216. In particular, the wireless communication device may have a layered software architecture to communicate with at least a first network and a second network. The software architecture may be distributed among the one or more baseband modem processor(s) 216, which may be part of and/or connected to the RF resources 218, 219. In various embodiments, such a layered software architecture may include multiple protocol stacks, each of which may be associated with a different SIM. The protocol stacks may be implemented to allow modem operation using information provisioned on multiple SIMs. Therefore, a protocol stack that may be executed by a baseband modem processor is interchangeably referred to herein as a modem stack.

The wireless communication device processor may detect an active communication on an RF resource supporting a communication network associated with a first SIM ("SIM-1") in block 402. In determination block 404, the wireless communication device processor may determine whether there is a simultaneous communication activity on a modem stack associated with a second SIM ("SIM-2").

In response to determining that there is no simultaneous communication activity on the modem stack associated with the second SIM (i.e., determination block 404="No"), the wireless communication device processor may employ opportunistic use of the first power-saving mode (e.g., ET) for the transmission on the modem stack associated with the first SIM. Specifically, in block 406 the wireless communication device processor may utilize at least one component of the second transmit chain (e.g., 308) associated with the second SIM (e.g., 204b), such as a DAC (e.g., 310) to operate a power amplifier (e.g., PA 306) in the first power-saving mode for the data transmission on the modem stack associated with the first SIM. The wireless communication device processor may return to determination block 404, continuing to operate the power amplifier (PA) in the first power-saving mode as long as there is no simultaneous communication activity on the modem stack associated with the second SIM.

In response to determining that there is a simultaneous communication activity on the modem associated with the second SIM (i.e., determination block 404="Yes"), the wireless communication device processor may determine whether the communication activity is a voice call in DTX mode in determination block 408. In response to determining that the communication activity is not a voice call and/or is not in DTX mode (i.e., determination block 408="No"), during the remainder of the communication activity, the wireless communication device processor may operate the power amplifier in a second power-saving mode (e.g., EPT or APT) mode for the data transmission on the modem stack associated with the first SIM until the end of the communication activity in block 410.

In response to determining that the communication activity is a voice call in DTX mode (i.e., determination block 408="Yes"), the wireless communication device processor may operate the power amplifier in the second power-saving mode (e.g., EPT or APT) for the start of the communication on the modem stack associated with the first SIM in block 411.

In determination block 412, the wireless communication device processor may determine whether a DTX silence period is detected on the modem stack associated with the second SIM. As discussed, determining whether a DTX silence period is detected may involve checking a flag in memory (e.g., determining whether a VAD flag is set) or determining whether a SID_FIRST frame is scheduled for transmission by the modem stack associated with the second SIM. As long as a DTX silence period is not detected (i.e., determination block 412="No"), the wireless communication device processor may monitor the modem stack associated with the second SIM for a DTX silence period in determination block 412.

In response to determining that a DTX silence period is detected on the modem stack associated with the second SIM (i.e., determination block 412="Yes"), the wireless communication device processor may identify the rate of SID frame transmissions employed by a voice encoder of the wireless communication device in block 416 (FIG. 4B). The SID frame transmission rate may be identified, for example, by an arbitrator or other operating in the physical layer of the modem stack associated with the second SIM. In some embodiments, the arbitrator may receive SID_UDPATE frames from a TX-DTX processor (e.g., 328), which may be used to identify the SID frame transmission rate. In some embodiments, the SID frame transmission rate may be determined by identifying (e.g., recalling from memory) the vocoder in use by the wireless communication device.

In block 418, the wireless communication device processor may identify the timing of SID frames scheduled by the modem stack associated with the second SIM. In some embodiments, determining the timing may be performed based on the identified SIM frame transmission rate and at least one SID frame, for example, a SID_UPDATE frame received by an arbitrator or other module operating in the physical layer of the modem stack associated with the second SIM. In block 420, the wireless communication device processor may switch operation of the power amplifier into the first power-saving mode for the gaps between the scheduled SID frames.

In determination block 422, the wireless communication device processor may determine whether the DTX silence period is ending. As described, determining whether the DTX silence period is ending may be performed by checking a flag in memory (e.g., determining whether a VAD flag is set) or determining whether a SID_ONSET frame is scheduled for transmission by the modem stack associated with the first SIM. As long as the DTX silence period is not ending (i.e., determination block 422="No"), the wireless communication device processor may maintain the first power-saving mode of operation for the power amplifier, while monitoring the DTX silence period in determination block 422.

In response to determining that the DTX silence period is ending (i.e., determination block 422="Yes"), the wireless communication device processor may switch operation of the power amplifier back to the second power-saving mode (e.g., EPT or APT) for the gaps between the scheduled SID frames in block 424. The wireless communication device processor monitor for detection of the next DTX silence period in determination block 412 (FIG. 4A).

The references to the first SIM (SIM-1) and the second SIM (SIM-2) are arbitrary and used merely for the purposes of describing the embodiments, and the wireless communication device processor may assign any indicator, name, or other designation to differentiate the SIMs and associated modem stacks. Embodiment methods apply the same regardless of which SIM is transmitting data to a high speed network. Further, such designations of SIMs and/or modem stacks may be switched or reversed between instances of executing the methods herein.

Figure 5:
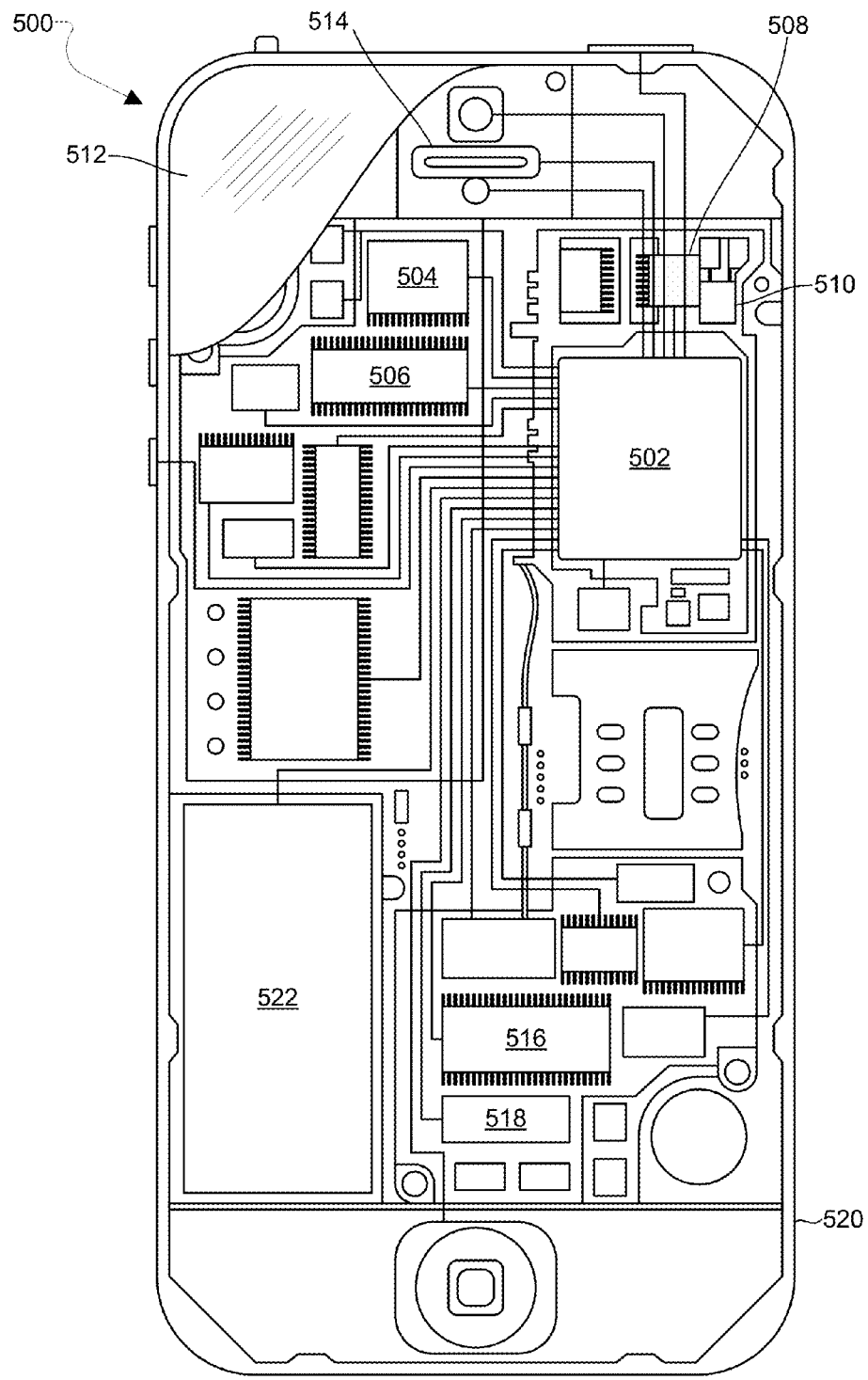
FIG. 5 is a component diagram of an example wireless communication device suitable for use with various embodiments.

The various embodiments (including, but not limited to, embodiments discussed above with reference to FIGS. 4A and 4B) may be implemented in any of a variety of wireless communication devices, an example 500 of which is illustrated in FIG. 5. For example, the wireless communication device 500 (which may correspond, for example, the wireless communication devices 102, 104, 200 in FIGS. 1-2) may include a processor 502 coupled to a touchscreen controller 504 and an internal memory 506. The processor 502 may be one or more multicore integrated circuits (ICs) designated for general or specific processing tasks. The internal memory 506 may be volatile or nonvolatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc. The wireless communication device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The transceivers 508 and antennae 510 may be used with the above-mentioned circuitry to implement the various wireless transmission protocol stacks and interfaces. The wireless communication device 500 may include a cellular network wireless modem chip 516 that enables communication via a cellular network and is coupled to the processor. The wireless communication device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The wireless communication device 500 may also include speakers 514 for providing audio outputs. The wireless communication device 500 may also include a housing 520, constructed of a plastic, metal, or a combination of materials, for containing all or some of the components discussed herein. The wireless communication device 500 may include a power source 522 coupled to the processor 502, such as a disposable or rechargeable battery. The rechargeable battery may also be coupled to the peripheral device connection port to receive a charging current from a source external to the wireless communication device 500.

Figure 6:
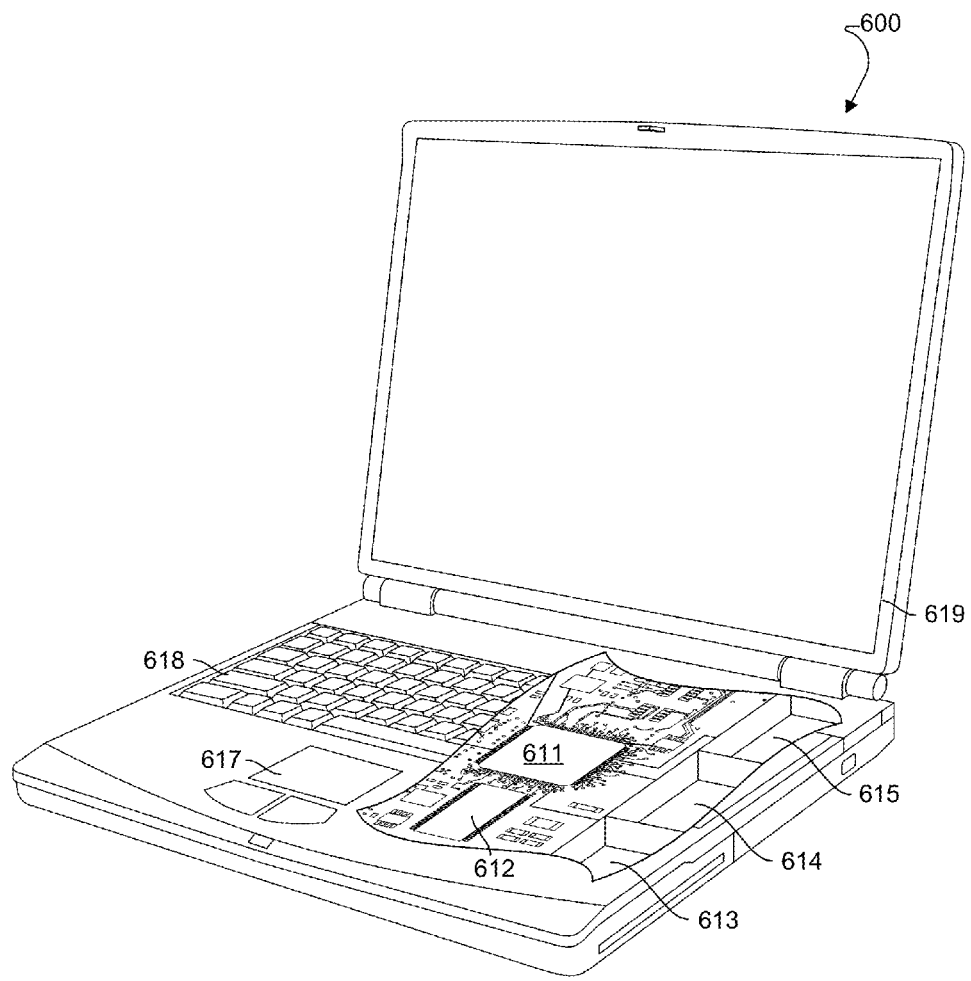
FIG. 6 is a component diagram of another example wireless communication device suitable for use with various embodiments.

The various embodiments described above (including, but not limited to, embodiments discussed above with reference to FIGS. 4A and 4B) may also be implemented within a variety of personal computing devices, such as a laptop computer 600 as illustrated in FIG. 6. Many laptop computers include a touchpad touch surface 617 that serves as the computer's pointing device, and thus may receive drag, scroll, and flick gestures similar to those implemented on wireless computing devices equipped with a touch screen display and described above. The laptop computer 600 will typically include a processor 611 coupled to volatile memory 612 and a large capacity nonvolatile memory, such as a disk drive 613 of Flash memory. The laptop computer 600 may also include a floppy disc drive 614 and a compact disc (CD) drive 615 coupled to the processor 611. The laptop computer 600 may also include a number of connector ports coupled to the processor 611 for establishing data connections or receiving external memory devices, such as a USB or FireWire® connector sockets, or other network connection circuits for coupling the processor 611 to a network. In a notebook configuration, the computer housing includes the touchpad touch surface 617, the keyboard 618, and the display 619 all coupled to the processor 611. Other configurations of the computing device may include a computer mouse or trackball coupled to the processor (e.g., via a USB input) as are well known, which may also be used in conjunction with various embodiments.

The processors 502 and 611 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 506, 612, 613 before they are accessed and loaded into the processors 502 and 611. The processors 502 and 611 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 502, 611, including internal memory or removable memory plugged into the device and memory within the processor 502 and 611, themselves.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or a non-transitory processor-readable storage medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the claims. Thus, the present invention is not intended to be limited to the embodiments shown herein but is to be accorded the widest scope consistent with the following claims and the principles and novel features disclosed herein.

What is claimed is:

1. A method of operating a power amplifier in a multi-subscriber identification module (SIM) multi-active wireless communication device when a first radio frequency (RF) resource supporting active communication to a communication network associated with a first SIM is communicating at the same time as a second RF resource supporting a voice call in discontinuous transmission (DTX) mode with a communication network associated with a second SIM, the method comprising:
    monitoring the voice call supported by the second RF resource for silence periods;
    operating the power amplifier in a first power-saving mode during silence periods on the voice call supported by the second RF resource; and
    operating the power amplifier in a second power-saving mode when the voice call supported by the second RF resource is not in a silence period, wherein the second power-saving mode provides less reduction in power consumption than the first power-saving mode.

2. The method of claim 1, wherein the first power-saving mode is an envelope tracking mode, and the second power-saving mode is one of an enhanced power tracking mode and an average power tracking mode.

3. The method of claim 1, wherein:
    monitoring the voice call supported by the second RF resource for silence periods comprises monitoring the second RF resource for silence descriptor (SID) frames scheduled by a modem stack associated with the second SIM;
    operating the power amplifier in a first power-saving mode during silence periods on the voice call supported by the second RF resource comprises operating the power amplifier in the first power-saving mode between transmissions of SID frames in response to transmission of a SID_FIRST frame; and
    operating the power amplifier in a second power-saving mode when the voice call supported by the second RF resource is not in a silence period comprises operating the power amplifier in the second power-saving mode when SID frames are scheduled for transmission by the modem stack associated with the second SIM or in response to transmission of a SID_ONSET frame.

4. The method of claim 3, wherein monitoring the second RF resource for SID frames scheduled by a modem stack associated with the second SIM comprises:
    identifying a transmission rate of the SID frames based on a vocoder being used for the voice call in DTX mode; and
    identifying timing of the SID frames scheduled by the modem stack associated with the second SIM based on the identified transmission rate and at least one SID frame generated by a transmit-DTX (TX-DTX) processor.

5. The method of claim 1, wherein operating the power amplifier in a first power-saving mode comprises:
    enabling at least one component of the second RF resource to process an envelope signal corresponding to an RF transmit signal representing data transmitted in communications with the communication network associated with the first SIM.

6. The method of claim 5, wherein the at least one component of the second RF resource comprises a digital-to-analog converter (DAC).

7. The method of claim 1, further comprising:
    detecting that the first RF resource supporting communications with the communication network associated with the first SIM is communicating at the same time as the second RF resource supporting the voice call in DTX mode based on a state of a voice activity detector (VAD) flag.

8. The method of claim 1, wherein the communication network associated with the first SIM employs a Long Term Evolution (LTE) radio access technology.

9. The method of claim 1, wherein the communication network employs a modulation scheme in which amplitude and phase of an RF transmit signal are used to represent a data transmission.

10. The method of claim 1, wherein the communication network associated with the second SIM employs a GSM or UMTS radio access technology.

11. The method of claim 1, wherein the communication network associated with the first SIM employs a radio access technology that allows for higher data speeds than the communication network associated with the second SIM.

12. A wireless communication device, comprising:
    a first radio frequency (RF) resource configured to connect to a first subscriber identity module (SIM);
    a second RF resource configured to connect to a second SIM; and
    a processor coupled to the first and second RF resources and configured with processor-executable instructions to:
        monitor a voice call supported by the second RF resource for silence periods while the first RF resource is supporting an active communication with a communication network associated with the first SIM, wherein the voice call is in discontinuous transmission (DTX) mode;
        operate a power amplifier in a first power-saving mode during silence periods on the voice call supported by the second RF resource; and
        operate the power amplifier in a second power-saving mode when the voice call supported by the second RF resource is not in a silence period, wherein the second power-saving mode provides less reduction in power consumption than the first power-saving mode.

13. The wireless communication device of claim 12, wherein the first power-saving mode is an envelope tracking mode, and the second power-saving mode is one of an enhanced power tracking mode and an average power tracking mode.

14. The wireless communication device of claim 12, wherein the processor is further configured with processor-executable instructions to:
   monitor the voice call supported by the second RF resource for silence periods by monitoring the second RF resource for silence descriptor (SID) frames scheduled by a modem stack associated with the second SIM;
   operate the power amplifier in a first power-saving mode during silence periods on the voice call supported by the second RF resource by operating the power amplifier in the first power-saving mode between transmissions of SID frames in response to transmission of a SID_FIRST frame; and
   operate the power amplifier in a second power-saving mode when the voice call supported by the second RF resource is not in a silence period by operating the power amplifier in the second power-saving mode when SID frames are scheduled for transmission by the modem stack associated with the second SIM or in response to transmission of a SID_ONSET frame.

15. The wireless communication device of claim 14, wherein the processor is further configured with processor-executable instructions to monitor the second RF resource for SID frames scheduled by a modem stack associated with the second SIM by:
   identifying a transmission rate of the SID frames based on a vocoder being used for the voice call in DTX mode; and
   identifying timing of the SID frames scheduled by the modem stack associated with the second SIM based on the identified transmission rate and at least one SID frame generated by a transmit-DTX (TX-DTX) processor.

16. The wireless communication device of claim 12, wherein the processor is further configured with processor-executable instructions to operate the power amplifier in a first power-saving mode by:
   enabling at least one component of the second RF resource to process an envelope signal corresponding to an RF transmit signal representing data transmitted in the active communication with the communication network associated with the first SIM.

17. The wireless communication device of claim 16, wherein the at least one component of the second RF resource comprises a digital-to-analog converter (DAC).

18. The wireless communication device of claim 12, wherein the processor is further configured with processor-executable instructions to:
   detect that the voice call supported by the second RF resource is in DTX mode while the first RF resource is supporting the active communication with the communication network based on a state of a voice activity detector (VAD) flag.

19. The wireless communication device of claim 12, wherein the communication network associated with the first SIM employs a Long Term Evolution (LTE) radio access technology.

20. The wireless communication device of claim 12, wherein the communication network associated with the first SIM employs a modulation scheme in which amplitude and phase of an RF transmit signal are used to represent a data transmission.

21. The wireless communication device of claim 12, wherein the voice call supported by the second RF resource comprises a communication on a network that employs a GSM or UMTS radio access technology.

22. The wireless communication device of claim 12, wherein the communication network associated with the first SIM employs a radio access technology that allows for higher data speeds than the communication network associated with the second SIM.

23. A wireless communication device, comprising:
   a first radio frequency (RF) resource configured to connect to a first subscriber identity module (SIM);
   a second RF resource configured to connect to a second SIM;
   means for monitoring a voice call supported by the second RF resource for silence periods while the first RF resource is supporting an active communication with a communication network associated with the first SIM, wherein the voice call is in discontinuous transmission (DTX) mode;
   means for operating a power amplifier in a first power-saving mode during silence periods on the voice call supported by the second RF resource; and
   means for operating the power amplifier in a second power-saving mode when the voice call supported by the second RF resource is not in a silence period, wherein the second power-saving mode provides less reduction in power consumption than the first power-saving mode.

24. A non-transitory processor-readable storage medium having stored thereon processor-executable instructions configured to cause a processor of a wireless communication device having first and second radio frequency (RF) resources respectively associated with first and second subscriber identity modules (SIMs) to perform operations comprising:
   monitoring a voice call supported by the second RF resource for silence periods while the first RF resource is supporting an active communication with a communication network associated with the first SIM, wherein the voice call is in discontinuous transmission (DTX) mode;
   operating a power amplifier in a first power-saving mode during silence periods on the voice call supported by the second RF resource; and
   operating the power amplifier in a second power-saving mode when the voice call supported by the second RF resource is not in a silence period, wherein the second power-saving mode provides less reduction in power consumption than the first power-saving mode.

25. The non-transitory processor-readable storage medium of claim 24, wherein the stored processor-executable instructions are configured to cause a processor of a wireless communication device to perform operations such that:
   monitoring the voice call supported by the second RF resource for silence periods comprises monitoring the second RF resource for silence descriptor (SID) frames scheduled by a modem stack associated with the second SIM;
   operating the power amplifier in a first power-saving mode during silence periods on the voice call supported by the second RF resource comprises operating the power amplifier in the first power-saving mode between transmissions of SID frames in response to transmission of a SID_FIRST frame; and operating the power amplifier in a second power-saving mode when the voice call supported by the second RF resource is not in a silence period comprises operating the power amplifier in the second power-saving mode when SID frames are scheduled for transmission by the modem stack associated with the second SIM or in response to transmission of a SID_ONSET frame.

26. The non-transitory processor-readable storage medium of claim 25, wherein the stored processor-executable instructions are configured to cause a processor of a wireless communication device to perform operations such that monitoring the second RF resource for SID frames scheduled by a modem stack associated with the second SIM comprises:
   identifying a transmission rate of the SID frames based on a vocoder being used for the voice call in DTX mode; and
   identifying timing of the SID frames scheduled by the modem stack associated with the second SIM based on the identified transmission rate and at least one SID frame generated by a transmit-DTX (TX-DTX) processor.

27. The non-transitory processor-readable storage medium of claim 24, wherein the stored processor-executable instructions are configured to cause a processor of a wireless communication device to perform operations such that operating the power amplifier in a first power-saving mode comprises:
   enabling at least one component of the second RF resource to process an envelope signal corresponding to an RF transmit signal representing data transmitted in communications with the communication network associated with the first SIM.

28. The non-transitory processor-readable storage medium of claim 24, wherein the at least one component of the second RF resource comprises a digital-to-analog converter (DAC).

29. The non-transitory processor-readable storage medium of claim 24, wherein the stored processor-executable instructions are configured to cause a processor of a wireless communication device to perform operations further comprising:
   detecting that the first RF resource supporting communications with the communication network associated with the first SIM is communicating at the same time as the second RF resource supporting the voice call in DTX mode based on a state of a voice activity detector (VAD) flag.

30. The non-transitory processor-readable storage medium of claim 24, wherein the communication network associated with the first SIM employs a Long Term Evolution (LTE) radio access technology.

* * * * *